UNITED STATES PATENT OFFICE.

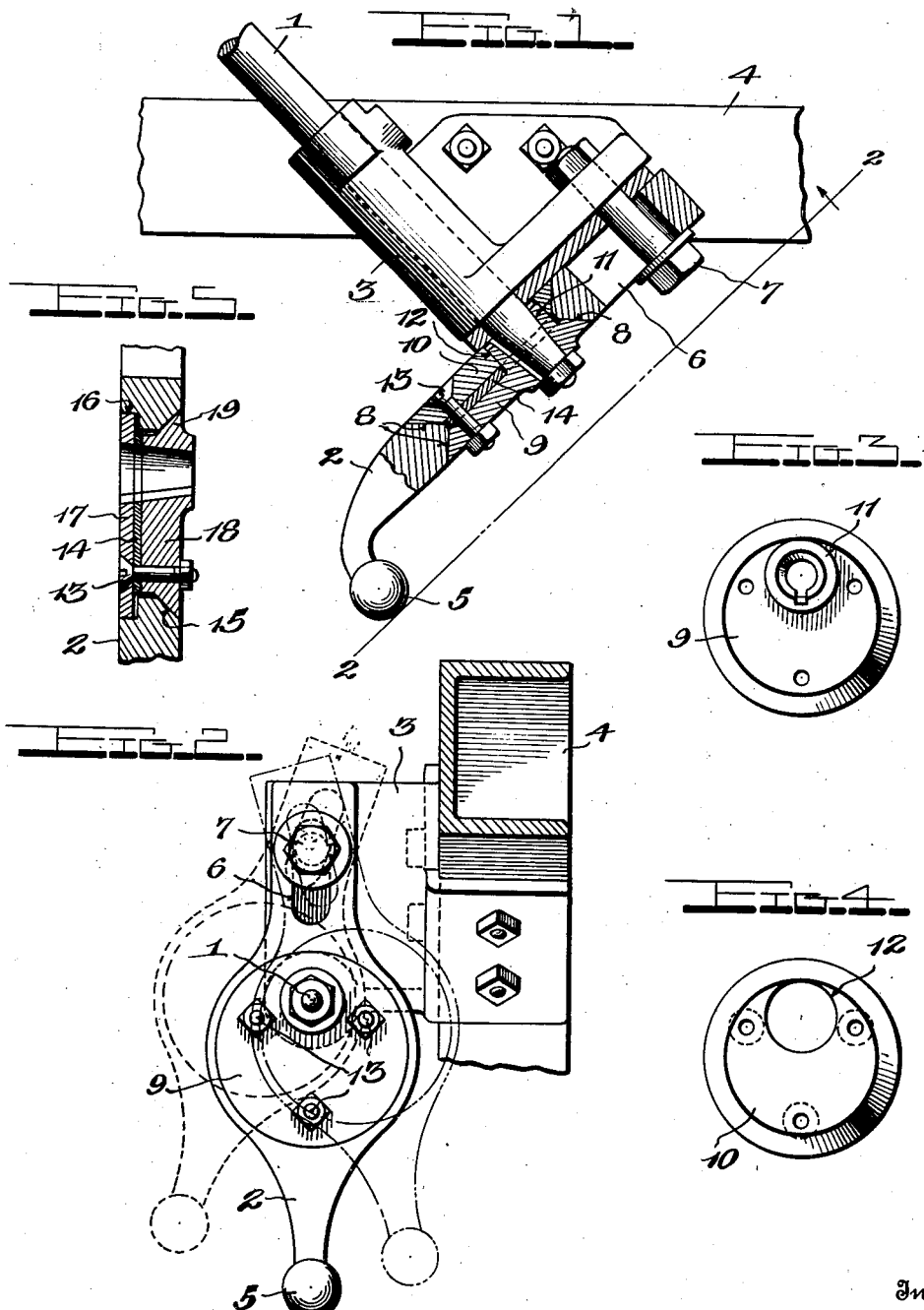

FRANKLIN L. LORD, OF JACKSONVILLE, FLORIDA.

STEERING-GEAR.

1,319,159.  Specification of Letters Patent.  Patented Oct. 21, 1919.

Application filed October 5, 1916. Serial No. 123,905.

*To all whom it may concern:*

Be it known that I, FRANKLIN L. LORD, a citizen of the United States, residing at Jacksonville, in the county of Duval and State of Florida, have invented new and useful Improvements in Steering-Gears, of which the following is a specification.

This invention is primarily designed to provide improved steering gear for automobiles and motor vehicles of every description utilizing a lever, or crank arm, as connecting means between the steering shaft and the link connected with the rod joining the arms of the steering knuckles.

The invention aims to materially lessen torque strain on the steering shaft; to render steering safe and easy; to compensate for and prevent road shocks and vibration being transmitted to the steering wheel, with the result that the driver is relieved of the usual nerve-racking strain and the steering is adapted to be effected with a greater degree of accuracy and with less effort and fatigue; to enable better control and to interpose safety means between the steering wheel and the road wheels, whereby the latter maintain their adjusted position and are not susceptible to movement by unequal resistance due to varying road conditions.

The invention consists of a lever, or crank arm, mounted to swing and move longitudinally and forming connecting means between the steering shaft and the guiding road wheels' connections and an eccentric connection between such lever, or crank arm, and the steering shaft.

The invention also consists of the peculiar mountings and connections of the several parts which hereinafter will be more fully set forth and particularly claimed.

In the drawings,

Figure 1 is a sectional view of the steering lever and eccentric connection between the same and the steering shaft, together with the mountings.

Fig. 2 is a view from the lower end, the supporting frame bar being in section on the line 2—2.

Fig. 3 is an inner face view of one member of the eccentric.

Fig. 4 is an inner face view of the complemental member of the eccentric.

Fig. 5 is a sectional view of a modification.

Corresponding and like parts are referred to in the following description and indicated in the several views of the drawing by the same reference characters.

The invention is intended more particularly for the Ford automobile and is illustrated in this adaptation, the steering shaft being indicated at 1 and the steering lever or crank arm, at 2. The steering shaft 1 is mounted in a bearing 3 which is attached to a frame bar 4 in any manner. The steering lever 2 is provided at its free end with the usual ball 5 to make connection with the link, not shown, which is attached to the rod connecting the arms of the steering knuckles, in the manner well understood.

The steering lever 2 is mounted to swing at one end as well as to move longitudinally. For this purpose, a slot 6 is formed in one end of the lever and extends longitudinally thereof and receives a bolt or fastening 7, which is mounted in the bearing 3 or supported in any substantial way. The lever turns and moves bodily on the bolt 7. Intermediate of its ends the lever 2 is formed with a circular opening in which is snugly fitted a disk secured eccentrically to the steering shaft 1 so as to turn therewith. This constitutes the eccentric connection between the shaft 1 and the lever 2, whereby the latter is pivotally and longitudinally moved upon turning the steering shaft. The connection between the lever and disk is such as to provide for adjustment to take up wear and maintain a close joint.

As shown in Fig. 1, the opening in the lever flares from a medial plane in opposite directions, as indicated at 8. The disk comprises similar members 9 and 10, the edges of the members being beveled to fit the flared walls 8 of the opening formed in the lever 2. One of the members, as 9, is formed with an offstanding annular flange 11 in line with an opening in said member to receive the lower end of the steering shaft 1 which is keyed or otherwise secured therein. The other member 10 has an opening 12 to receive the flange 11. The beveled edges of the members 9 and 10 form a V-shaped groove, when said members are properly assembled, which receives the V-shaped edge 8—8 of the circular opening of the lever 2. Bolts or like fastenings 13 secure the members 9 and 10 when fitted in the opening of the lever. A packing 14 is placed between the members 9 and 10 to properly space them. This packing may be replaced by other packing varying in thickness when adjusting the members 9 and 10 to secure a snug fit of the disk in the circular opening of the lever 2.

Fig. 5 shows a modification in which the lever 2 has one end of the circular disk-receiving opening flared, as at 15, and the opposite end enlarged uniformly, as at 16. A flat disk member 17 fits in the enlarged end 16 and a member 18 having an outer flange 19 fits in the flared end 15 of the opening. The members 17 and 18 are secured together by fastenings 13 and have a packing 14 between them.

The present combination and arrangement of parts brings about a change in the distance between the pivot 7 and the center of the eccentric 9, thereby bringing about a variable leverage, whereby there is obtained a relatively long movement of the free end of the lever without increasing the length of the lever. It also produces a compensating movement in which, as the eccentric approaches the dead center and the lateral swing of the lever decreases, the shortening of the distance between the pivot and the eccentric center increases the lateral swing of the lever thereby compensating the one decrease by the other increase of the lateral swing.

The eccentric connection between the steering shaft 1 and the steering lever 2 provides means for relieving the driver of shock, prevents the front or guiding road wheels from moving from a set position when subjected to unequal resistance resulting from varying road conditions, enables easier control, greater accuracy in steering and assures safety, since the steering wheel is at all times under control and can be moved to a certainty to a given position.

Having described the invention, what I claim is:—

1. In steering mechanism, a fixed support, a steering lever provided at one end with a slot and pin slidable and pivotal mounting upon the support, the other end of the lever being free for connection with the steering rod, said lever being also provided between its ends with a circular opening, a disk rotatable in the circular opening, and a steering shaft secured to the disk eccentrically thereof, the center of the disk being located between the steering shaft and the free end of the lever in the middle position of the lever.

2. In steering mechanism for automobiles and the like, the combination of a steering lever provided at its lower end with a connecting element for engagement with a steering rod, the upper portion of the lever being provided with a longitudinal slot, there being a circular opening in the lever below the slot, a fixed fulcrum received in the slot and on which the lever may turn and slide, a disk rotatable in the opening, and a steering shaft secured eccentrically to the disk at a point above the center thereof in the middle position of the lever.

3. In steering mechanism, a fixed support, a steering lever mounted at one end upon the support to both swing laterally and move longitudinally thereon and provided between its ends with a circular opening, a two-part disk fitted in the circular opening, and a steering shaft secured to the disk eccentrically thereof.

4. In steering mechanism, a steering lever mounted to swing and move longitudinally and formed with a circular opening, a steering shaft, a two-part disk fitted in the circular opening of the lever, with a portion of the lever disposed between edge portions of the disk parts, and means for securing the parts of the disk and adjusting them to take up wear.

5. In steering mechanism, a steering lever mounted to swing and move longitudinally and formed with a circular opening, a steering shaft, a two-part disk fitted in the circular opening of the lever, one of the disk parts having an offstanding annular flange to receive the steering shaft, and the other disk member having an opening to receive the said annular flange, and means for adjusting and securing the parts of the disk.

6. In steering mechanism, a fixed support, a steering lever having a longitudinal slot at one end receiving the fixed support upon which it swings laterally and slides longitudinally, said lever having a circular opening between its ends, a two-part disk having portions embracing opposite sides of the lever and portions entering the circular opening thereof and spaced apart, and a steering shaft secured to the disk eccentrically thereof.

FRANKLIN L. LORD.

In the presence of—
G. C. PICKARD,
M. P. MITCHELL.